E. HAZELIP.
VALVE.
APPLICATION FILED MAY 6, 1911.

1,039,391.

Patented Sept. 24, 1912.

Inventor
Edwin Hazelip,

Witnesses
By Victor J. Evans,
Attorney

UNITED STATES PATENT OFFICE.

EDWIN HAZELIP, OF BALTIMORE, MARYLAND, ASSIGNOR OF ONE-FOURTH TO THOMAS B. TRIMBLE, OF BALTIMORE, MARYLAND, AND ONE-HALF TO ALEXANDER L. CUMMINGS, OF MELVALE, MARYLAND.

VALVE.

1,039,391.

Specification of Letters Patent. Patented Sept. 24, 1912.

Application filed May 6, 1911. Serial No. 625,502.

*To all whom it may concern:*

Be it known that I, EDWIN HAZELIP, a citizen of the United States of America, residing in the city of Baltimore and State of Maryland, have invented new and useful Improvements in Valves, of which the following is a specification.

This invention relates to valves, and has for an object to provide an improved form of seat therefor removably mounted in the diaphragm in the valve and disposed directly in the path of movement of an extracting screw which latter can be operated or adjusted so as to engage the seat and remove the same from the diaphragm when it is desired to regrind the seat or to substitute a new one for a worn one.

Figure 1:
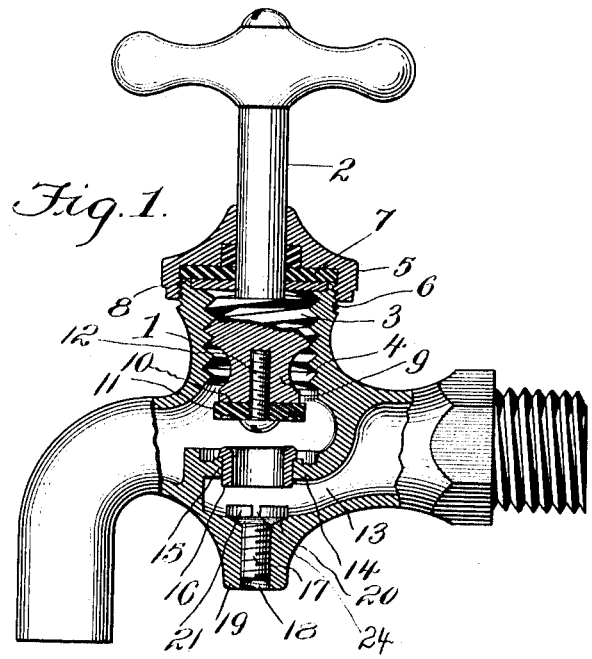
Figure 2:
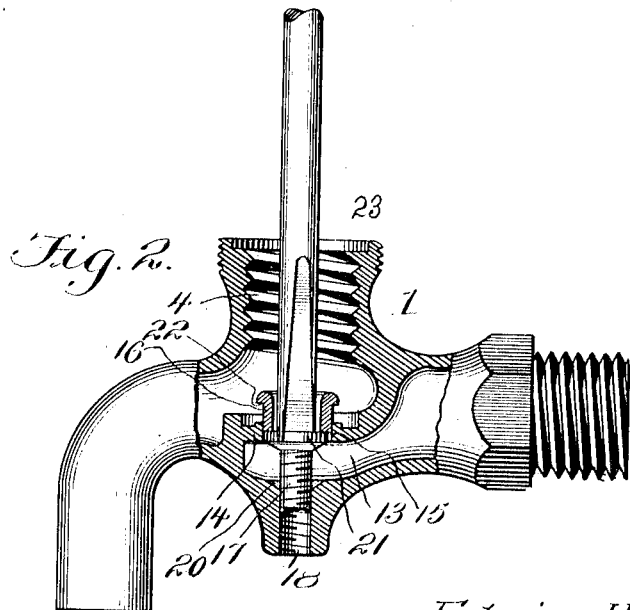

In the drawing, forming a portion of this specification and in which like numerals of reference indicate similar parts in the several views:—Figure 1 is a side elevation of a valve with parts in section to clearly illustrate the seat construction, the extracting screw being in its lowered position. Fig. 2 is a similar view showing the extracting screw adjusted to a position to engage the seat so as to move the same away from the diaphragm.

The valve 1 may be of any suitable well known construction in so far as the portway and configuration of the valve structure is concerned, being provided with a valve stem 2 on which is formed a threaded portion 3 for engagement with an interiorly threaded portion 4 of the valve. The stem is provided with a nut 5 which is adjustable on the exteriorly threaded portion 6 of the valve and which carries a suitable packing 7 to bear against the edge portion 8 of the valve to prevent leakage. The threaded portion 3 of the valve stem is provided with a depending reduced portion 9 which is formed with a flat face 10 against which a fiber washer 11 is seated and held by the adjusting screw 12, which latter extends through the washer and into a correspondingly threaded passage in the portion 9.

The valve chamber 13 is formed with a diaphragm 14 which has an opening 15 therein to receive the hollow valve seat 16. The seat 16 has its lower end extended below the diaphragm and disposed directly in the path of movement of the extracting screw 17. The screw 17 is removably fitted in a correspondingly threaded passage 18 in the lug 19 of the valve body, the upper end of the passage being formed with a flared surface 20 to be engaged by the corresponding surface on the head 21 of the extracting screw. The passage 15 is slightly larger in diameter than the diameter of the head 21 of the extracting screw so that on one movement of the screw the head may be brought to bear against the lower end of the valve seat 16 to loosen the same from the diaphragm and to permit the same to be removed with the screw. The upper surface of the valve seat is formed with a stop flange 22 which engages against the upper surface of the diaphragm so as to limit the movement of the valve seat in one direction and to prevent the same from being moved entirely through the passage 15.

From the construction described it will be seen that when the valve stem is removed a screw-driver or other suitable tool can be inserted through the opening 23 of the valve and through the opening in the valve seat and engaged in the kerf 24 in the headed portion of the screw. The screw can then be rotated to cause the same to move into engagement with the valve seat so as to permit the latter to be entirely freed or released from the diaphragm.

I claim:—

A valve seat comprising a hollow member, a support having an aperture therein and adapted to slidably receive the said seat, a removable valve seat extracting element disposed immediately below the said seat and arranged in axial alinement therewith, the said extracting element being formed to provide a head having a slightly lesser diameter than that of said seat, the said extracting element being adapted to move in an upward direction whereby the said head engages the lower end of the said seat so as to move the same to an extracted position from the support.

In testimony whereof I affix my signature in presence of two witnesses.

EDWIN HAZELIP.

Witnesses:
C. ARTHUR EBY,
C. CRAIG SEARS.